Nov. 24, 1942.  L. R. WILLIAMSON  2,303,101
CHUCK
Filed July 9, 1940  4 Sheets-Sheet 1

INVENTOR.
LARKIN R. WILLIAMSON
BY
ATTORNEYS.

Nov. 24, 1942.   L. R. WILLIAMSON   2,303,101
CHUCK
Filed July 9, 1940   4 Sheets-Sheet 2

INVENTOR.
LARKIN R. WILLIAMSON
BY
ATTORNEYS.

Nov. 24, 1942.    L. R. WILLIAMSON    2,303,101
CHUCK
Filed July 9, 1940    4 Sheets-Sheet 3

INVENTOR.
LARKIN R. WILLIAMSON
BY
ATTORNEYS.

Nov. 24, 1942.   L. R. WILLIAMSON   2,303,101
CHUCK
Filed July 9, 1940   4 Sheets-Sheet 4

INVENTOR.
LARKIN R. WILLIAMSON
BY
ATTORNEYS.

Patented Nov. 24, 1942

2,303,101

UNITED STATES PATENT OFFICE 2,303,101

CHUCK

Larkin R. Williamson, Brooklyn, N. Y., assignor to Lucien I. Yeomans, Inc., Chicago, Ill., a corporation of Illinois Application July 9, 1940, Serial No. 344,511

4 Claims. (Cl. 279—39)

The present invention relates to a chuck or work holder and is particularly directed to a mechanism by which an object may be gripped and worked during relative rotation between the object and a tool.

Chucks of various kinds, as for instance collet chucks or jaw chucks, are old in the art. However, all such devices prior to my present invention have, as far as I am aware, been subject to certain operating disadvantages. Chucks in which the jaws are manually moved to grip an object are satisfactory for use with small parts where the time of handling and the weight involved are minor considerations. Mechanically operated chucks, as air chucks, have been resorted to where the workpiece was large or where the time required for the clamping operation was to be held to a minimum.

Air chucks have many disadvantages, requiring large amounts of air at high pressure for operation, which sometimes requires the incorporation in the plant installation of an air compressor equipment for the sole purpose of operating the devices. Furthermore, such mechanisms have been difficult to balance when in rotation, especially at relatively high speeds. The result has been to give an off balance rotation to the chuck and the part held thereby providing excessive wear on the bearings and impairing the accuracy of the work done.

The general object of the present invention has been to overcome the disadvantages set out above heretofore present in power operated chucks, as exemplified by the air chuck discussed. A more specific object of the invention has been to provide a chuck operating mechanism which may be maintained in dynamic balance during rotation of the chuck and which will eliminate uneven wear on the bearings and maintain the workpiece concentric with its predetermined axis of rotation, thus providing increased efficiency in use.

Still another object of the invention has been to provide a chuck of either the jaw or collet type which may be power operated to grip a workpiece by the rotation of a self-contained electric motor. A still further object of the invention has been to provide such a motor driven mechanism in which various load torques may be applied to the rotor to thereby control the degree of clamping action exercised by the jaws.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting however, but one of various forms in which the principle of the invention may be used.

In general a chuck embodying the present invention will be provided with an electric motor, the rotor of which is adapted to drive mechanism opening or closing the chuck jaws. To this end the motor will be made reversible. The drive is accomplished by a motor of the so-called torque motor type which is characterized by the ability to assume a load and stall under load and maintain the load while stalled. Such a motor is of a type well known in the art and comprises a finely wound high resistance stator with a squirrel cage rotor mounted with suitable collector rings for the transmission of power to the chuck and the motor while the same are mounted for rotation on a machine tool spindle.

After the motor has been run enough to shift the jaws and stall under the load then assumed it may be cut off and, due to the self-locking connection from the motor to the jaws, the latter will remain in the stalled position.

It will be apparent that while the invention is preferably embodied in a chuck which is mounted for rotation, it is equally applicable to a mechanism in which the workpiece is held stationary by the chuck and the tool is movably mounted.

Figures 1, 2:
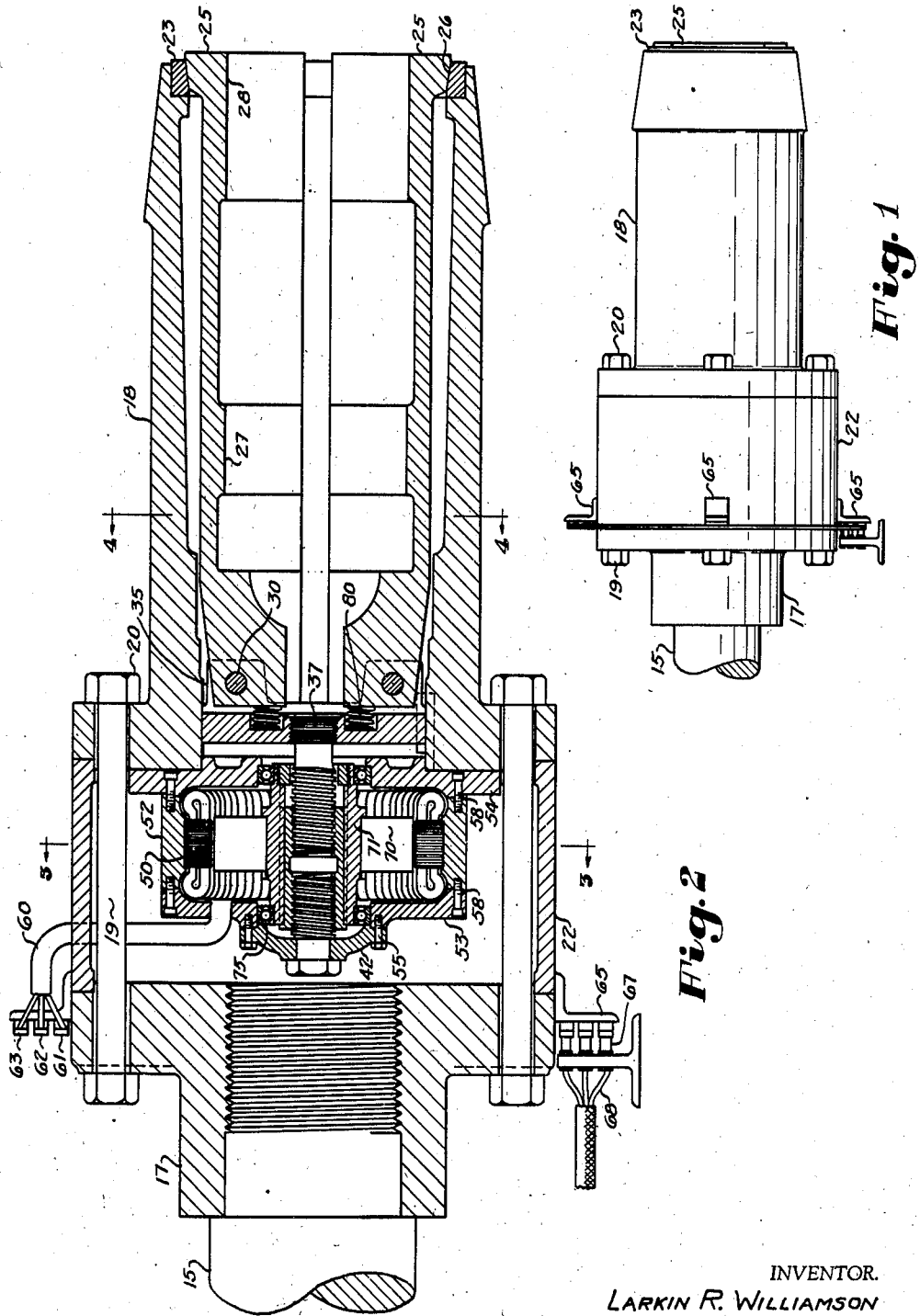
Fig. 1 is a side elevation of a collet type chuck embodying my invention.
Fig. 2 is a longitudinal section in a plane coincident with the axis of the chuck and parallel to Fig. 1.
Figure 3:
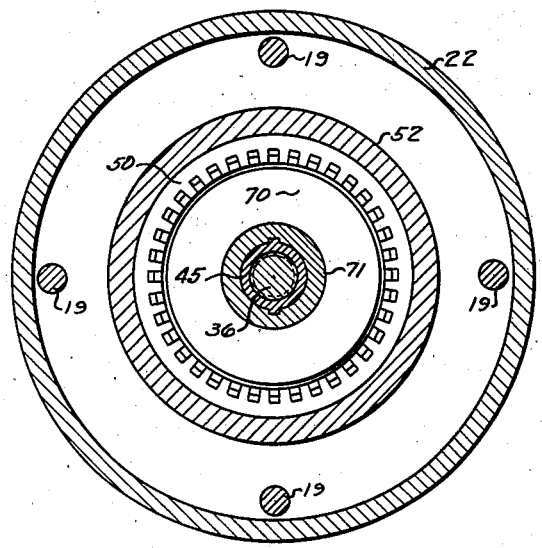
Fig. 3 is a section through Fig. 2 as indicated by the lines 3—3 thereon.
Figure 4:
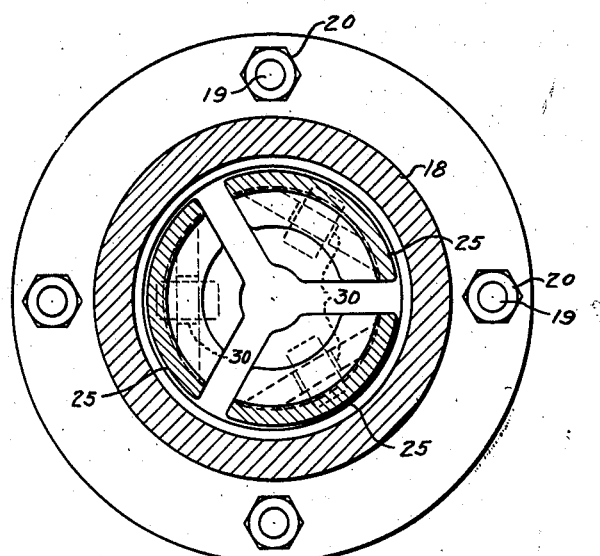
Fig. 4 is a section through Fig. 2 as indicated by the lines 4—4 thereon.

Referring first to the construction shown in Figs. 1, 2, 3 and 4, there is provided a collet chuck of the type adapted to receive and hold a shell forging for boring the interior thereof. Such a shell will have been machined on the exterior prior to insertion in the chuck. There is provided a machine tool spindle 15 which threadingly receives a face plate 17 in turn supporting a collet sleeve 18 by means of bolts 19 and nuts 20. A barrel 22 is inserted between the sleeve and the face plate to provide space for the accommodation of the electric motor drive mechanism.

At the outer end of the sleeve 18 is a hardened internally tapered ring 23 mounted to cam three collet chuck jaws 25 inwardly radially as the same are drawn toward the spindle by mechanism hereafter described. To this end an outer annular ring 26 of each jaw is tapered as shown, such that in clamping position the inner clamping surfaces 27 and 28 of each jaw will be uniformly spaced from the like surfaces of the other jaws and will cooperate with them to grip the workpiece in a manner well known in the art. Each of the jaws is pivotally mounted at 30 to a spider 35.

Figure 7:
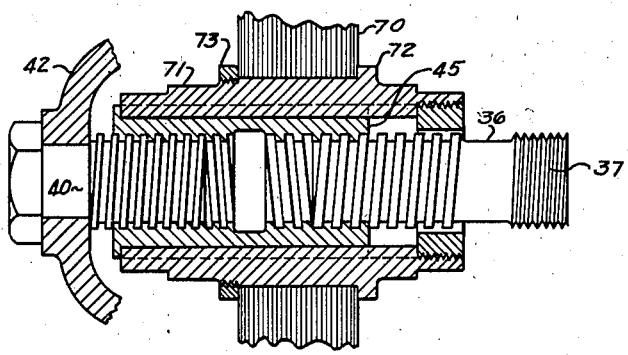
Fig. 7 is an enlarged detail of the screw operated mechanism employed in the constructions of either Fig. 2 or Fig. 5.

The jaws are moved axially of the mechanism to be separated or drawn together as desired by a screw feeding device, best shown in Fig. 7. To this end a bolt 36 is threadingly received at 37 in the spider 35 and at its unsupported end is provided with a screw thread, the pitch of which may, in one instance, be five threads to the inch. In alignment with the said bolt is a second bolt 40 mounted in an end cap 42, hereafter described. This bolt is also provided with a screw thread at its unsupported end and in the example given its pitch will be four threads to the inch. The two bolts are mounted in opposed relation to each other and are each simultaneously engaged by a double threaded nut 45 threaded at one end to correspond to the five-pitch bolt and the other end to correspond to the four-pitch bolt. It will be apparent from the description thus far that if the nut is turned and each of the bolts 36 and 40 are held against rotation, the latter also being mounted against axial movement, then the first bolt 36 will be shifted axially of the mechanism in an amount determined by the pitch differential between the two bolts. As above indicated, the movable bolt 36 carries a four-pitch thread and the fixed bolt a five-pitch thread. Thus for each complete rotation of the nut the movable bolt will be shifted axially one-twentieth of an inch. This will in turn shift each of the jaws 25 axially by the same amount due to the threaded connection 37 with the spider and the pivotal connection 30 between the spider and each jaw. This movement will cause the jaw surfaces 26 to ride on the tapered ring 23, thus moving the jaws in or out radially, depending on the direction of rotation of the nut 45.

The pitch constants given in connection with the bolts and the corresponding movement of the jaws are not to be interpreted as the critical in connection with this invention but are exemplary. Any desired variation in pitch may be provided, depending on the rate of movement desired in the jaws as long as there is a pitch differential between the two bolts 36 and 40.

A torque motor having the characteristics above set out is mounted in the barrel 22 between the flanged end of the sleeve 18 and the face plate 17. This motor comprises a stator 50 carried in a frame comprising a ring 52, and end plate 53 and a second end plate 54. The cap 42 heretofore mentioned is bolted to the end plate 53 by bolts 55; the end plate in turn being bolted to the ring 52 by bolts 58. The ring and the other end plate are secured together by similar bolts. The latter end plate is secured in any desired manner to the sleeve 18 to prevent relative movement between the parts.

The stator winding is of the high resistance torque motor type and is so constructed that it may be connected in a three-phase line and the three leads being carried to collector rings 61, 62 and 63 respectively. These rings are mounted on an angle member 65 on the exterior of the face plate 17 and are each engaged by a brush 67 respectively, which brushes are in turn connected to leads 68 providing a three-lead connection to the stator 50.

The rotor of the motor is of the squirrel cage type comprising the usual plates 70 mounted on a sleeve 71 and held in place against a shoulder 72 by a nut 73. The sleeve in turn is mounted in ball bearings 75 which support the same at each end. The sleeve is splined on its inner surface to receive the corresponding splines on the exterior of the nut 45, thus holding the two parts for synchronous rotative movement while permitting axial travel of the nut with respect to the rotor as it moves on the bolt 40. The motor is reversible.

From the above description it will be apparent that as the motor is energized the rotor will turn, carrying with it the nut 45 which, as heretofore set out, will result in axial travel of the latter on the bolt 40, thus providing axial travel of the bolt 36 with resultant movement of the jaws 25. Depending on the direction of rotation, the jaws will be moved into work gripping relation or out of work gripping relation.

To hold the jaws open when no workpiece is therebetween a series of stout coil springs 80 are provided, as shown, to provide a bell crank action for each jaw, tending to hold the same outwardly against the ring 23.

The motor stator may be connected electrically in a plurality of circuits to a three-phase source of power to provide various torques in the mechanism as required by the conditions of use. This will be hereafter described in detail.

Figure 5:
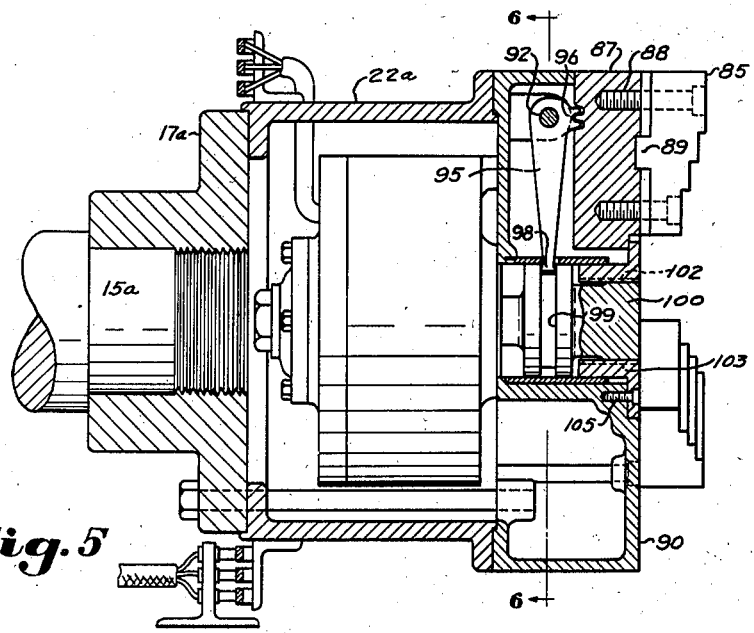
Fig. 5 is a section similar to Fig. 2, but showing a jaw type chuck as contrasted with the aforenamed collet chuck.
Figure 8:
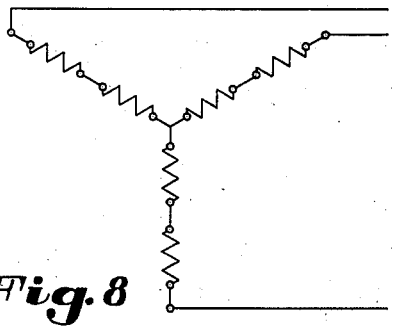
Fig. 8 is a wiring diagram showing the electrical connections for a single Y three-phase connection to the torque motor.
Figure 10:
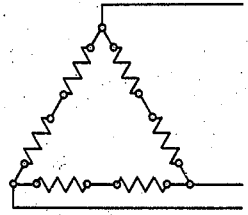
Fig. 10 shows the motor connected in delta.
Figure 9:
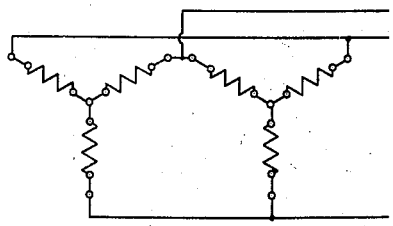
Fig. 9 is a similar diagram showing the motor connected in double Y.
Figure 11:
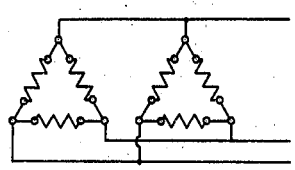
Fig. 11 shows the motor connected in double delta.
Figure 6:
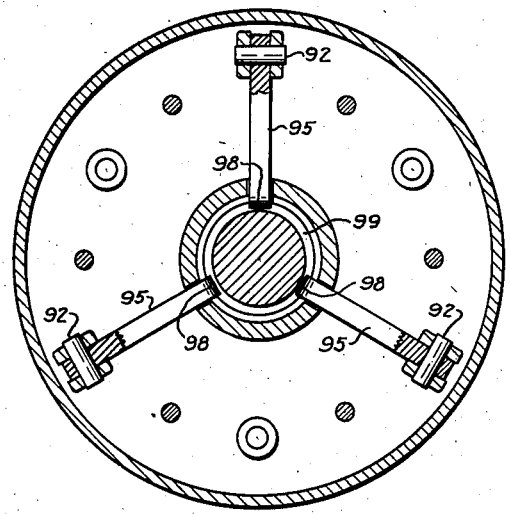
Fig. 6 is a transverse section through Fig. 5 as indicated by the lines 5—5 thereon.

A jaw type chuck embodying the present invention is shown in Figs. 5 and 6 and incorporates identical operating mechanism, as shown in Fig. 7, which may likewise be electrically connected as shown in Figs. 8 through 11. For this reason the motor, the thread construction and like features will not be again described, it being understood that they are incorporated in the jaw clutch mechanism, within a barrel 22ª which is secured to a face plate 17ª, as previously described in connection with the sleeve 17 and the barrel 22. The corresponding spindle is indicated at 15ª.

A conventional three-jaw clutch is bolted or otherwise secured to the free end of the barrel 22ª, as shown in Fig. 5. This clutch comprises three-step jaws 85 which are bolted to the radially movable bars 87 by bolts 88. The jaws as shown are adapted to grip the exterior of an article to be worked but it will be understood that they may be reversed to grip the interior of an article if desired. Thrust is transmitted through each jaw to its corresponding bar by a shoulder 89. The jaws, as indicated, are movable radially of the clutch and to this end are slidingly supported in a cylindrical case 90 of ordinary construction well known in the art.

Pivotally mounted in the case at 92 are three bell crank members 95 generally corresponding to the bell crank portions of the collet chuck members 25. One end of each member is toothed as at 96 to engage a corresponding toothed section cut in each bar 87. The opposite end of each bell crank is formed as at 98 to be received in an annular recess 99 forming part of a bolt member analogous to the member 36 described in connection with Fig. 1. This bolt member, indicated at 100, is at one end formed exactly as the bolt 36 and at its other end is provided with a splined portion 102 slidingly received in a mating spline 103 bolted as at 105 to the case 90. This prevents relative rotation of the bolt member 100 and the chuck.

From the foregoing description it will be apparent that the construction of Figs. 5 and 6 is such that the jaws 85 will be moved in or out radially, depending upon the direction of axial movement of the bolt 100 in the case 90. Since the unsupported end of the bolt is formed as heretofore described in connection with Fig. 7 and cooperates with the torque motor in exactly the same manner, it follows that, depending upon the actuation of the said motor there will be a corresponding movement of the jaws 85.

The wiring diagrams of Figs. 8 through 11 are employed with either of the constructions described since the operating mechanism is in each case the same.

The stator as heretofore indicated is of the three-phase type being provided with leads to permit such connection to a source of power.

On referring to Figs. 8 through 11 however, it will be apparent that provision is made for connecting the motor in either single Y or delta, or double Y or delta. Accordingly, the stator windings must be arranged to permit the connection shown in these figures. In double Y, for instance, two complete stator windings are in effect provided, while in single Y each leg of the circuit includes two windings in series.

A similar situation prevails in delta and double delta connections.

With the indicated wiring diagrams four torque ranges are possible in the device, the lowest being a three-phase connection to the stator in single Y and the greatest torque being provided by a three-phase connection to the stator in double delta. Intermediate ranges are possible by the double Y and the single delta connection.

From the foregoing description it will be apparent that I have provided a novel chuck mechanism which is adapted to various uses and which may be rotatably or fixedly mounted on a support. It will also be apparent that the power means for actuating the jaws may be operated in different torques and also that when the chuck is rotatably mounted the parts may be maintained in balance, permitting greater accuracy in work and reducing the wear on the supporting bearings.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In mechanism of the class described, a member adapted to support a workpiece, a plurality of jaws mounted for movement toward and from each other carried by said member and adapted to cooperate to grip a workpiece, a reversible electric torque motor comprising a relatively rotatable rotor and stator carried by said member, an element mounted for rotation with said rotor and slidable axially thereof within the rotor confines, and means for interconnecting said element and each of said jaws to shift said jaws in and out of work gripping relation as said motor is energized, said motor being adapted to assume four different torque ranges in accordance with different three-phase current connections to said stator with the lowest torque being provided in single Y, the greatest in double delta and intermediate ranges in double Y and single delta connections, said motor stalling after having assumed the respective load while maintaining said load irrespective of the jaw pressure and without damage to the motor as long as said motor is electrically excited.

2. In a chuck mechanism, a member mounted for rotation as part of a machine tool, a plurality of work gripping jaws pivotally carried by said member and shiftable with respect thereto to grip a workpiece, a screw shiftably carried by said member coincident with the axis of rotation of said member, means interconnecting said screw and said jaws to actuate the latter upon axial movement of the former, a second screw coaxial with said first screw and fixedly carried by said member, the pitch of said screws being different, a nut with one portion threadingly engaging said first screw and another portion threadingly engaging said second screw, a rotor fixedly carried on said nut and comprising part of a reversible torque motor, a stator for said motor in cooperating relation with said rotor, said torque motor being adapted to assume four different loads in accordance with four different three-phase current connections and stall thereunder while maintaining said loads, collector rings carried by said member to supply current to said motor, and means to apply energy to said collector rings.

3. In a chuck mechanism, a member mounted for rotation as part of a machine tool, a plurality of work gripping jaws pivotally carried by said member and shiftable with respect thereto to grip a workpiece, a screw shiftably carried by said member coincident with the axis of rotation of said member, means interconnecting said screw and said jaws to actuate the latter upon movement of the former, a second screw coaxial with said first screw and fixedly carried by said member, the pitch of said screws being different, a nut with one portion threadingly engaging said first screw and another portion threadingly engaging said second screw and power operated means to rotate said nut and shift said first screw.

4. In a chuck mechanism, a member mounted for rotation as part of a machine tool, a plurality of work gripping jaws pivotally carried by said member and shiftable with respect thereto to grip a workpiece, a screw shiftably carried by said member coincident with the axis of rotation of said member, means interconnecting said screw and said jaws to actuate the latter upon axial movement of the former, a second screw coaxial with said first screw and fixedly carried by said member, the pitch of said screws being different, a nut with one portion threadingly engaging said first screw and another portion threadingly engaging said second screw, a rotor fixedly carried on said nut and comprising part of a reversible torque motor, a stator for said motor in cooperating relation with said rotor, said torque motor being adapted to assume a load and stall thereunder while maintaining said load, collector rings carried by said member to supply current to said motor, and means to apply energy to said collector rings.

LARKIN R. WILLIAMSON.